Aug. 5, 1930.  R. R. GRANT  1,772,215
METHOD OF MAKING PISTONS
Filed July 18, 1923  2 Sheets-Sheet 1
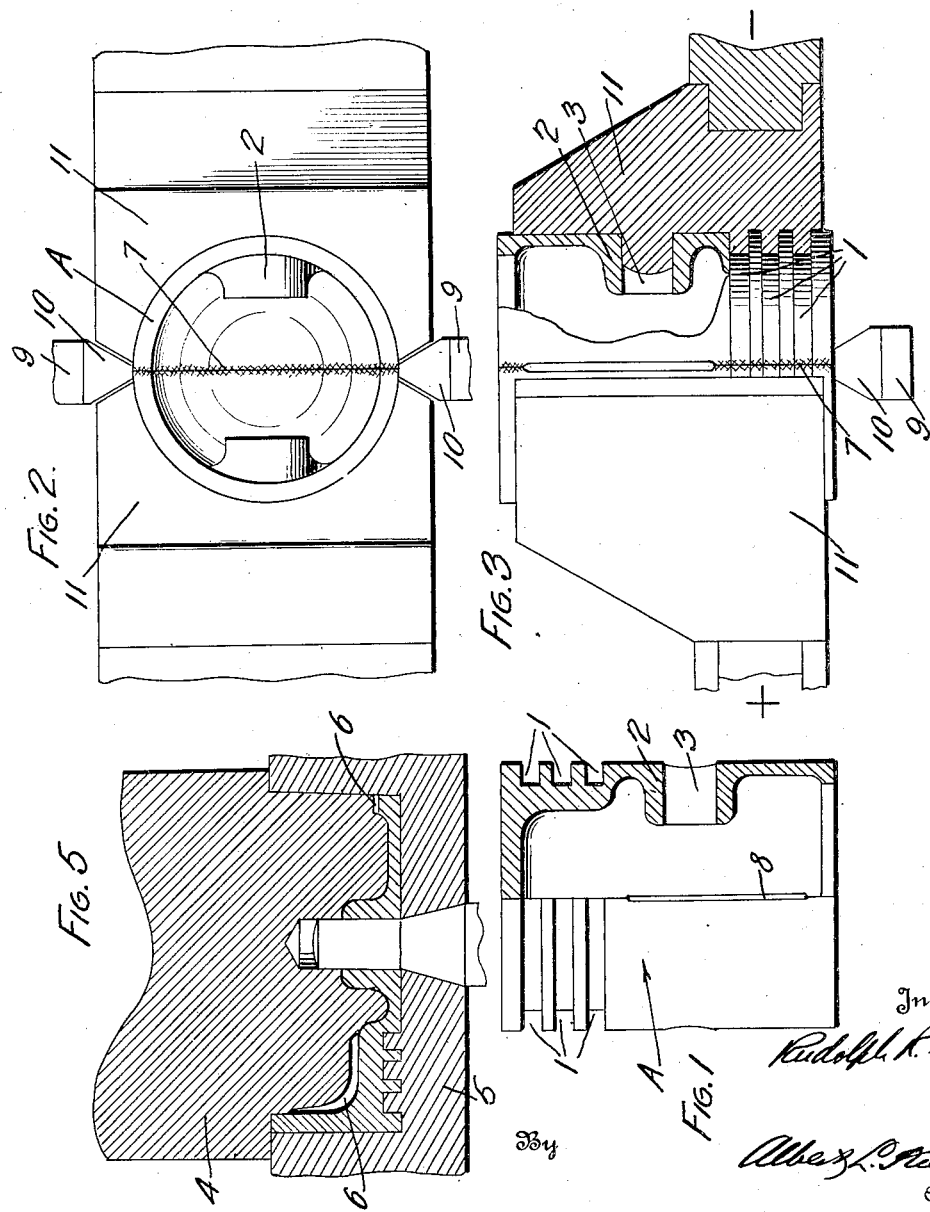

Aug. 5, 1930.  R. R. GRANT  1,772,215
METHOD OF MAKING PISTONS
Filed July 18, 1923  2 Sheets-Sheet 2
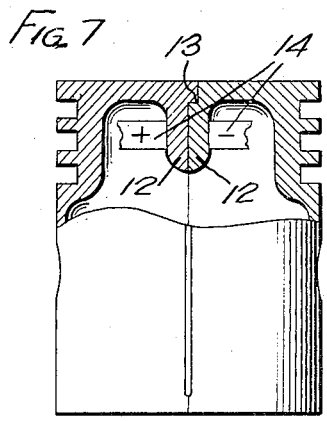
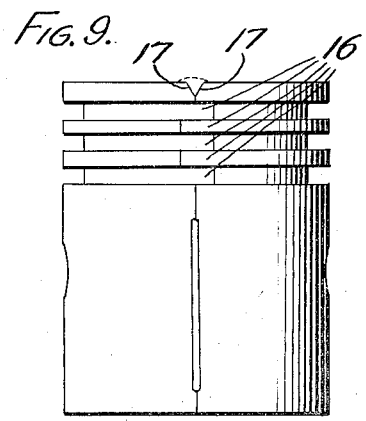
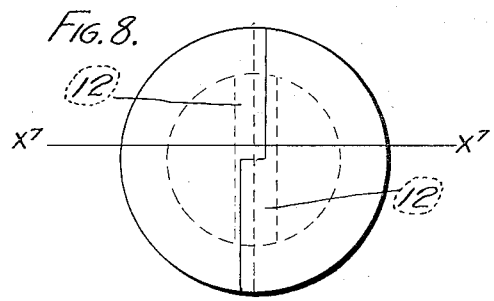
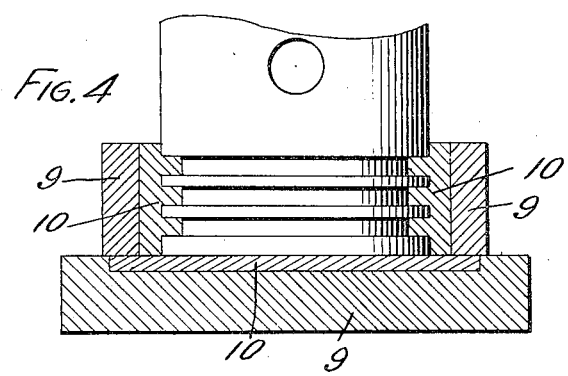
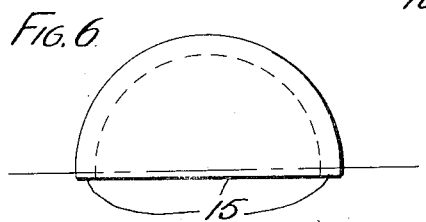

Patented Aug. 5, 1930

1,772,215

UNITED STATES PATENT OFFICE

RUDOLPH R. GRANT, OF ROSELLE, NEW JERSEY

METHOD OF MAKING PISTONS

Application filed July 18, 1923. Serial No. 652,402.

This invention relates to pistons and method of making the same. While the method herein disclosed is especially applicable in the manufacture of pistons for use in internal combustion engines, it will be understood that the same may apply to other types of engines or pumping machinery.

Numerous attempts have been made to simplify the manufacturing operations of pistons without eliminating the technical requirements, or to increase production to reduce the cost of manufacture to a minimum. Many changes in the structural features of pistons have been suggested, and to some extent followed, in order to increase the efficiency of the piston under working conditions.

The piston herein disclosed and the method of making the same has these objects in view. To this end a departure is made from the general practice both in the method of manufacture of the piston and to some exten in the structural features thereof.

The piston is made up of a plurality of sections or elements, preferably two in number, and duplicates of each other, which are assembled and permanently united at an angle to the axis of the piston pin.

As will be hereinafter more fully described, each element or section of the piston is cast or fashioned so that it is brought to approximately final form or accurate in final dimensions after which the sections are brought together and united by welding.

The mechanism of the casting and the pressing or forging machine employed should be arranged so that accurate production of the sections or elements is secured, thereby eliminating the rough machining operations and its attendant delays and expense.

In the detailed description hereinafter set forth reference will be had to the accompanying drawings. To those skilled in the art it will be apparent that the drawings are representative of the structures involved and changes therein may be made as conditions require without departing from the spirit of the invention.

Fig. 1 is a side view, partly in section illustrating a common type of piston, the sections thereof being in contact.

Fig. 2 is a plan view illustrating the piston sections after the electric butt welding operation.

Fig. 3 is a side view, partly in section of the mechanism shown in Fig. 2.

Fig. 4 is a view illustrating the chills or insulators in the position assumed during the welding operation.

Fig. 5 is a fragmentary view in section indicating the pressing or forging of the piston section.

Fig. 6 is a plan view of a piston illustrating the excess metal at the welding surfaces.

Fig. 7 is a sectional view on the line $X^7$—$X^7$ of Fig. 8, illustrating a piston, the sections of which are united by spot welding.

Fig. 8 is a plan view of Fig. 7.

Fig. 9 illustrates a piston the sections of which may be lapped and gas welded.

The piston A as shown in Fig. 1, is representative of the standard type and is provided with the desirable number of ring grooves 1 and with the usual pin bosses 2 and openings 3 therein. Obviously, the number of ring grooves may be increased or decreased and a ring groove provided at the base of the piston, or other structural changes made if desired, without departing from the spirit of the invention.

By preference, and for simplicity of manufacturing operations, the piston is made of two sections, preferably duplicates of each other.

The piston disclosed in Figs. 1, 7 and 9, is one that is well adapted to any of the casting operations and may be fashioned from any of the metals now in common use, for example, cast iron, semi-steel, aluminum and its alloys.

In fashioning the piston sections of cast iron or semi-steel, a chill mold is preferably employed, so that a smooth, close-grained finish is provided upon the exterior or working surface of the sections. This mold is provided with the usual complementary parts, suitable provision being made for a gate located as foundry practice may require. Those portions of the mold which shape the working faces of the sections are accurately formed so that the piston sections are cast as close to final form or dimension as possible. Since the sections are by preference duplicates, and substantially semi-cylindrical in form, the use of a core is eliminated and the same mold will produce the two sections. Any slight irregularities on the working surfaces of the piston may be removed by a light machining or finishing operation.

The sections of the piston when fashioned from aluminum or its alloys, are cast to approximately final form or dimension by any of the modern methods of casting, for example, die casting. In this case, the die is accurately formed so that the piston sections are shaped to approximately final form or dimension with a chilled working surface. Any slight irregularities on the surfaces of the sections that may be present after the casting may be removed by a light machining or finishing operation.

After the casting operation the piston may be pressed or forged. In this case the piston sections are cast as described above, but with a slight excess of metal on their interior surfaces. The sections are then heated to a suitable forging temperature, which will vary according to the metal or alloy used, and presented to the pressing or forging machine. This device employs the usual male and female portions 4 and 5, (see Fig. 5), which are formed as accurately as possible to conform to the final shape and dimension of the piston. Pressure is then applied and the section is given its final form, this operation tending to remove any irregularities in the surface of the piston that may be present, as well as to provide homogeneity in the metal contained therein.

Suitable provision should be made for the escape of any surplus metal under the action of the press, and this may be accomplished by relieving a small portion of the male member of the die, as indicated at 6 at points that will not interfere with the surfaces to be brought together in the welding operation.

By using a silicon-aluminum alloy, a smooth and uniform surface can be formed upon the working faces of the piston sections, owing to its relative low shrinkage upon solidification. The use of this alloy will also tend to produce uniform coalescence of the sections along the line of weld.

The two sections of the piston disclosed in Fig. 1, when completed, are preferably united by an electric butt-weld 7 across the top or head of the piston, and downwardly along the side thereof below the lowermost ring groove of the top series. (See Figs. 2 and 3.) Obviously, the piston sections may be welded along each side to the full extent of the skirt, but under ordinary service conditions, it is believed that a weld along the upper face or top of the piston and down the side below the lower ring groove will be sufficient. A further weld at the bottom of the skirt leaving an opening as indicated at 8 in Fig. 1 may be used.

In fabricating the piston elements or sections by any of the methods herein disclosed or now in use for the electric butt-welding operation, each piston section should be fashioned with an excess of metal along the welding faces, as indicated at 15 in Fig. 6, so that during the welding operation, a sufficient amount of metal will be present to insure a proper weld, any surplus metal forming the flash.

The welding surfaces of the sections are preferably formed at an angle to the axis of the piston pin so that the impulses imparted to the piston under working conditions will not be transmitted directly to the line of weld.

After the piston sections or elements have been suitably fabricated, each element is placed in proper position upon an electric welding machine for the welding operation.

In order to maintain the working surface of the piston as smooth and uniform as possible, it is desirable to prevent, or at least minimize, an extrusion of the metal outward toward the working surface of the piston. To this end there may be utilized a plurality of abutments 9 provided with suitable chills or insulation 10. After the piston sections have been placed in the proper position on the welding machine, the abutments 9 are brought into contact with the piston walls under a uniform and constant pressure sufficient to resist the outward extrusion of the metal. The electrodes or clamping jaws 11 of the welding machine are formed with concave surfaces for accurate engagement with the exterior or working surfaces of the piston. The electrodes or jaws 11 are preferably made of such width as to substantially enclose the piston, sufficient clearance being provided for the abutments and the manipulation of the various parts. By so forming the electrodes or jaws, a substantially uniform pressure will be exerted upon the relatively thin walls of the piston, thereby tending to eliminate distortion. Suitable stops should be provided to limit the inward movement of the jaws. The mechanical pressure and electric current is then applied, and the elements or sections are welded. The amount of mechanical pressure and the character of the electric current necessary for this operation will vary according to the character of the material to be welded and the area of the welding surfaces. Tables and data for the determination of these factors are well known to those skilled in the art.

In Fig. 7 a piston of slightly different construction is shown, and like the structure shown in Fig. 1, consists of a plurality of elements, preferably two in number, and duplicates of each other which may be fashioned by casting or die casting. The structure is such that the parts may be readily united by the spot welding process. To this end, each piston section is provided with a downwardly projecting flange which is adapted to contact with a similar flange formed on the other section or element. A lap joint 13 is preferably formed above the flanges to insure a tight joint. The flanges are reversed or staggered in respect to one another transversely of the piston and at the center thereof, as shown in Fig. 8. The piston sections or elements having been suitably formed are properly positioned and welded together by the application of the spot welding machine or appliance, indicated at 14, to the flanges 12, as shown in Fig. 7.

In Fig. 9 there is disclosed a piston of slightly different form than in Figs. 1 and 7. The piston comprises a plurality of sections or elements preferably two in number, and duplicates of each other. The elements may be fashioned in the manner heretofore described. Each section, along the abutting faces, adjacent the ring grooves is staggered to form a series of lap joints 16. The laps may continue along the skirt of the pistons if desired. The elements or sections may be electrically butt-welded as heretofore described in connection with the piston shown in Fig. 1. Should it be desired to gas weld the piston, each section along the top face at the abutting edge thereof is beveled as at 17, so as to form a groove when the sections are assembled. The piston sections are brought into proper alinement with each other, and thereafter heated to the proper welding temperature, the groove being filled with a proper metal to form a union of the parts. Any surplus metal left on the exterior of the piston after the welding operation may be quickly removed by grinding.

What is claimed is:

1. The hereinbefore described method of making pistons which consists in casting a plurality of sections to approximately final form, chilling the working surfaces of said sections during the casting and thereafter bringing the sections together and uniting the same by welding.

2. The hereinbefore described method of making pistons which consists in casting a plurality of sections to approximately final form, chilling the working surface of said sections during the casting, subjecting the casting to pressure and thereafter bringing the sections together and uniting the same by welding.

3. The hereinbefore described method of making pistons which consists in casting a plurality of sections to approximately final form, subjecting the casting to pressure, and thereafter bringing the sections together and uniting the same by welding.

4. The hereinbefore described method of making pistons which consists of casting a plurality of sections to approximately final form, heat treating the same, subjecting the casting to pressure, and thereafter bringing the sections together and uniting the same by welding.

5. The hereinbefore described method of making pistons which consists in casting a plurality of sections to approximately final form, chilling the working surface of said sections during the casting, heat treating the cast sections and subjecting the same to pressure, and thereafter bringing the sections together and uniting the same by welding.

6. The hereinbefore described method of making pistons which consists in casting a plurality of sections to approximately final form with a slight excess of metal on the interior surface, heat treating the cast section, and subjecting the sections to compression, and thereafter bringing the sections together and uniting the same by welding.

7. The hereinbefore described method of making pistons which consists in casting a plurality of sections to approximately final form with a slight excess of metal on the interior surface of the section, chilling the working surface of said section during the casting, subjecting the casting to pressure to remove any imperfections therein and to extrude the surplus metal, and thereafter bringing the sections together and uniting the same by welding.

8. The hereindescribed method of making pistons which consists in casting a plurality of sections to approximately final form with an excess of metal at the edges thereof, and thereafter bringing the sections together and uniting the same by electric welding.

9. The hereinbefore described method of making pistons which consists in casting a plurality of sections to approximately final form with an excess of metal at the edges thereof and thereafter bringing the sections together and uniting the same by electric welding, arresting the outward extrusion of the metal during the welding operation.

10. The hereinbefore described method of making pistons which consists in casting a plurality of sections to approximately final form, forging the sections, uniting the same by welding and thereafter machining or grinding the working surface of the piston.

RUDOLPH R. GRANT.